United States Patent [19]
Thivierge
[11] 4,227,840
[45] Oct. 14, 1980

[54] DRILLING ATTACHMENT FOR CHAIN SAW

[76] Inventor: Clovis Thivierge, R.R. No. 2, Drummondville, Quebec, Canada

[21] Appl. No.: 40,190
[22] Filed: May 18, 1979
[51] Int. Cl.[3] ........................ B23B 43/00; B27G 17/00
[52] U.S. Cl. ........................................ 408/20; 29/560; 144/35 A; 144/104; 408/126
[58] Field of Search ............... 408/20, 126; 144/35 A, 144/104; 29/560

[56] References Cited

U.S. PATENT DOCUMENTS

| | | | |
|---|---|---|---|
| 2,489,772 | 11/1949 | Hall | 144/35 A X |
| 2,526,131 | 10/1950 | Harnish et al. | 144/35 A X |
| 2,783,794 | 3/1957 | Kroll | 144/35 A |
| 3,073,193 | 1/1963 | Grant | 408/20 |
| 3,606,707 | 9/1971 | Naslund | 51/241 S |
| 3,736,991 | 6/1973 | Maine | 408/20 X |

FOREIGN PATENT DOCUMENTS 899116 5/1972 Canada .

*Primary Examiner*—Z. R. Bilinsky

[57] ABSTRACT

A drilling attachment adapted to be fixed to a chain saw and a chain saw so equipped wherein the driving output shaft and a drill chuck are advantageously connected by a pair of friction drive wheels to produce clockwise rotation of the drill chuck and thus allow the use of standard and less expensive clockwise drills, to automatically provide for relative slipping without using a slip clutch, to produce the desired speed reduction, and to allow trouble and failure-free operation in the field, such as to drill holes in maple trees to collect the sap thereof. This drilling attachment includes a first friction drive wheel and a second friction drive wheel frictionally engaging each other with the second friction drive wheel rotatively carried by a bracket adjustably securable to the chain saw. A drill chuck is fixedly connected to the second friction drive wheel for bodily rotation clockwise therewith.

6 Claims, 2 Drawing Figures

DRILLING ATTACHMENT FOR CHAIN SAW

This invention relates to a drilling implement and, more particularly, to a drilling attachment for a chain saw and to a chain saw so equipped.

It has been proposed in the past to equip a chain saw with a drilling attachment for drilling of holes in the field, such as, for instance, to drill holes in maple sugar trees to collect the maple sap. The drilling attachments which have been proposed so far either include a driving chain or have the drill chuck directly mounted on the driving output shaft.

In either case, the rotation is counterclockwise as for the cutting chain and this disadvantageously imposes the buying of relatively less current and more expensive counterclockwise drills. Besides, with the driving chain, there is preferably associated a slip clutch. Drilling attachments with a driving chain are relatively heavy and require two operators to be properly operated. Also, the driving chain and sprocket assembly is prone to malfunctioning and can hardly be serviced or repaired in the field. Also, the chain and sprocket assembly effectively requires a slip clutch for satisfactory operation and this substantially adds to the overall encumbrance of the drilling attachment.

In the case of the drilling attachment wherein the drill chuck is directly fixed to the driving output shaft of the chain saw, there is also the disadvantage that the speed of the drill is found too high for conventional drilling.

It is a general object of the present invention to provide a drilling attachment for a chain saw which obviates the abovementioned disadvantages.

It is a main object of the present invention to provide a drilling attachment for a chain saw which produces clockwise rotation of the drill chuck and thus uses the more standard and readily available clockwise drills.

It is an object of the present invention to provide a drilling attachment for a chain saw and a chain saw so equipped which essentially require no maintenance or repair in the field and are substantially failure-proof; that is, very unlikely to have a complete failure of the drill attachment itself.

It is another object of the present invention to provide a drilling attachment for a chain saw which does not require a slip clutch but provides the benefits thereof.

The applicant has noted that the above-mentioned disadvantages may be avoided by the use of a friction drive between the driving output shaft and the drill chuck to produce clockwise rotation of the drill, with added advantages of simplicity, low maintenance, very unlikeliness to suffer total failure in the field, and the possibility to adjust the force of frictional engagement between a driving and a drive friction drive wheels.

Figure 1:
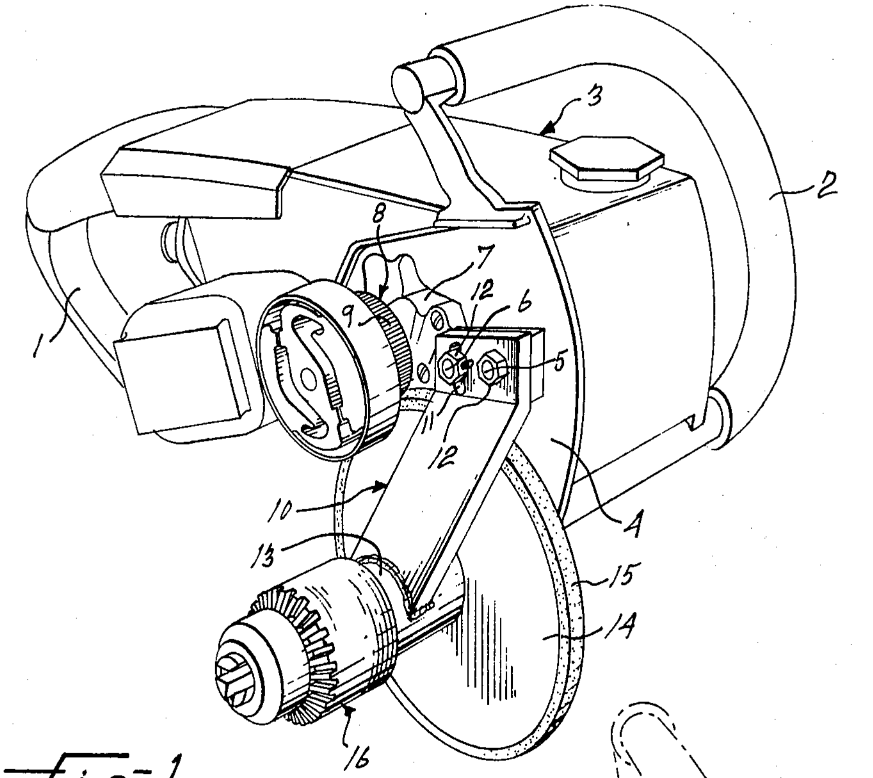
Figure 2:
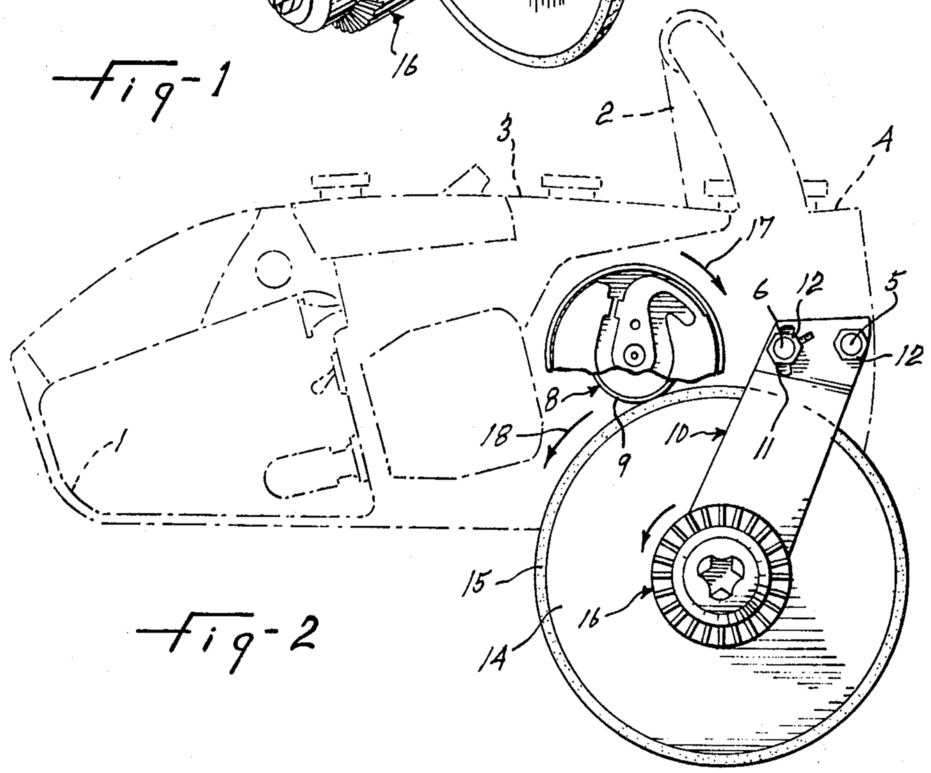

The above and other objects and advantages of the present invention will be better understood with reference to the accompanying description of a preferred embodiment thereof which is illustrated, by way of example, in the accompanying drawing, in which:

FIG. 1 is a perspective view of a drilling attachment and of a chain saw equipped therewith according to the present invention; and FIG. 2 is a side elevation view of the drilling attachment with the chain saw outlined in dotted lines.

The illustrated chain saw is of conventional construction and includes the handles 1 and 2 fixed to the housing 3 containing the motor, the gas tank and the other associated elements. One side of the housing 3 is provided with a mounting plate 4 which conventionally supports the cutter bar of the saw by means of a pair of stud bolts 5 and 6. The mounting plate 4 also supports a bearing block 7 in which is rotatively mounted the driving output shaft, not shown, of the chain saw. This output shaft projects endwise from the bearing block 7 to support the usual drive sprocket for the chain of the chain saw.

According to the present invention, the chain drive sprocket, the chain and the cutter bar are removed and replaced by the drilling attachment which is hereinafter defined in details.

The illustrated drilling attachment includes a first friction drive wheel 8 which is fixedly mounted on the driving shaft, not shown, of the saw to bodily rotate therewith. The peripheral surface of the first friction drive wheel 8 is knurled, as by longitudinal grooving 9, to form a roughened peripheral surface.

A mounting bracket 10 is fixed by the stud bolts 5 and 6 in replacement of the cutter bar of the chain saw. The mounting bracket 10 is formed with a hole and an arc-shaped slot 11 for engagement of the bolts 5 and 6, respectively therein. It may readily be seen that the bracket 10 may thus be adjusted angularly around the stud bolt 5 and locked in place by nuts 12 on the stud bolts.

The mounting bracket 10 includes a journal portion 13 rotatively carrying a shaft, not shown, therein. A second friction drive wheel 14 is fixedly secured to the shaft in the journal portion 13. The friction drive wheel 14 has its circumferential face covered with a layer 15, of rubber or the like, to frictionally engage the knurled periphery 9 of the friction drive wheel 8.

A drill chuck 16, of conventional construction, is fixed to the shaft carried in the journal portion 13 and thus bodily rotates with the second friction drive wheel 14.

It must be noted that the friction drive defined by the friction drive wheels 8 and 14 allows slippage in the drive train, when desired. Furthermore, the afore-mentioned arc-shaped slot 11 allows to adjust the frictional contact force between the two friction drive wheels 8 and 14.

The nut 12 on the stud bolt 6 is locked in place by an allan screw, as shown in FIG. 2, or by a lock washer.

As may be seen in FIG. 2, the normal rotation of the driving output shaft of the saw produces rotation of the first friction drive wheel 8 in the direction of the arrow 17. The action of the friction drive wheel 8 on the friction drive wheel 14 results in opposite rotation of the latter in the direction of the arrow 18 and a corresponding clockwise operative rotation of the drill chuck 16. Thus, a standard clockwise drill may be used in the drill chuck 16.

What I claim is:

1. For a chain saw having a driving output shaft and a cutter bar connection device adjacent the driving output shaft, the invention comprising a drilling attachment including a first friction drive wheel securable on said driving output shaft for bodily rotation therewith, a mounting bracket rigidly securable to said cutter bar connection device, a second friction drive wheel rotatively carried by said mounting bracket and operatively frictionally engaging said first friction drive wheel and driven by the latter, and a drill chuck fixedly connected to the second friction drive wheel and bodily rotating with the latter in response to rotation of the first friction drive wheel in operative engagement with the second friction drive wheel.

2. A drilling attachment as defined in claim 1, wherein the first friction drive wheel has a knurled periphery and the second friction drive wheel has a soft rim element bonded thereto and operatively engaged by said knurled periphery.

3. A drilling attachment as defined in claim 2, wherein said soft rim element constitutes a rubber rim.

4. A drilling attachment as defined in claim 1, 2 or 3, wherein said cutter bar connection device includes a pair of laterally spaced-apart stud bolts projecting endwise from the chain saw, said mounting bracket includes an arc-shaped adjustment slot and a hole operatively receiving said bolts respectively and allowing pivotal adjustment of said bracket about one stud bolt upon selective positioning of the other stud bolt along the arc-shaped slot.

5. A converted chain saw comprising a driving output shaft, a pair of laterally spaced-apart stud bolts projecting endwise on one side of the chain saw adjacent and parallel to the driving output shaft, a first friction drive wheel securable on said driving output shaft for bodily rotation therewith, a mounting bracket rigidly securable to said stud bolts, a second friction drive wheel rotatively carried by said mounting bracket and operatively frictionally engaging said first friction drive wheel and driven by the latter, and a drill chuck fixedly connected to the second friction drive wheel and bodily rotating with the latter in response to rotation of the first friction drive wheel in operative engagement with the second friction drive wheel.

6. A converted chain saw as defined in claim 5, wherein the first friction drive wheel has a knurled periphery, the second friction drive wheel has a rubber rim bonded thereto and operatively engaged by said knurled periphery, and said mounting bracket includes an arc-shaped adjustment slot and a hole operatively receiving said bolts respectively and allowing pivotal adjustment of said bracket about one stud bolt upon selective positioning of the other stud bolt along the arc-shaped slot.

* * * * *